United States Patent
Suh (10) Patent No.: US 11,227,492 B2
(45) Date of Patent: Jan. 18, 2022

(54) SOLAR INDUCTION LAMP AND INDUCTION SYSTEM USING SAME

(71) Applicant: GNITECH CO., LTD., Anyang-si (KR)

(72) Inventor: Chang Beom Suh, Yongin-si (KR)

(73) Assignee: GNITECH CO., LTD.

( * ) Notice: Subject to any disclaimer, the term of this patent is extended or adjusted under 35 U.S.C. 154(b) by 0 days.

(21) Appl. No.: 16/858,910

(22) Filed: Apr. 27, 2020

(65) Prior Publication Data

US 2020/0258384 A1    Aug. 13, 2020

Related U.S. Application Data (63) Continuation of application No. PCT/KR2019/000928, filed on Jan. 22, 2019.

(30) Foreign Application Priority Data

Jun. 14, 2018  (KR) .................... 10-2018-0068052

(51) Int. Cl.
*G08G 1/085*    (2006.01)
*E01F 9/559*    (2016.01)
(Continued)

(52) U.S. Cl.
CPC ............. *G08G 1/085* (2013.01); *E01F 9/559* (2016.02); *F21S 8/032* (2013.01); *F21S 9/037* (2013.01);
(Continued)

(58) Field of Classification Search
CPC ........ G08G 1/085; G08G 1/095; H05B 45/10; H05B 45/20; H05B 47/19; E04H 6/426; F21S 8/032; E01F 9/559; H04W 84/18
See application file for complete search history.

(56) References Cited

U.S. PATENT DOCUMENTS 10,869,109 B2 *  12/2020  Jo ..................... G07C 5/008
2011/0077459 A1 *  3/2011  Rofougaran ........... G16H 20/17
                                                       600/103
(Continued)

FOREIGN PATENT DOCUMENTS

KR    10-2006-0011803 A    2/2006
KR       10-1036582 B1    5/2011
(Continued)

OTHER PUBLICATIONS

Korean Office Action (KR 10-2018-0068052), KIPO, dated Oct. 19, 2018.
(Continued)

*Primary Examiner* — Quan-Zhen Wang
*Assistant Examiner* — Mancil Littlejohn, Jr.
(74) *Attorney, Agent, or Firm* — Park & Associates IP Law, P.C.

(57) ABSTRACT

The present invention relates to a solar induction lamp and an induction system using same. The solar induction lamp has a wireless communication module equipped therein to support wireless communication with a controller, so that light can be emitted in various colors and periods according to a lighting cycle of the controller to increase the visibility of lane identification and at the same time, effectively guide a vehicle according to signal connection and special purpose. The solar induction lamp is configured to perform wireless communication with the controller according to a preset communication period (T) to enhance energy efficiency by effectively preventing power consumption due to continuous data communication, and after a deactivation information generating module detects a charge amount of a capacitor and compares the charge amount with a threshold value, if the charge amount is lower than the threshold value, the solar induction lamp is configured to be turned on or off (Continued)

according to an initial setting without performing wireless communication, so that the functions of lane identification and vehicle guidance can be performed with minimal energy consumption according to the charge amount.

2 Claims, 7 Drawing Sheets

(51) Int. Cl.
*H05B 47/19* (2020.01)
*H05B 45/10* (2020.01)
*F21S 8/00* (2006.01)
*F21S 9/03* (2006.01)
*E04H 6/42* (2006.01)
*H04W 84/18* (2009.01)

(52) U.S. Cl.
CPC ............ *H05B 45/10* (2020.01); *H05B 47/19* (2020.01); *E04H 6/426* (2013.01); *H04W 84/18* (2013.01)

(56) References Cited

U.S. PATENT DOCUMENTS

| 2012/0262067 A1* | 10/2012 | Tam | H05B 45/10 |
| | | | 315/119 |
| 2013/0234598 A1* | 9/2013 | Bora | H05B 45/22 |
| | | | 315/113 |
| 2018/0192374 A1* | 7/2018 | Jain | H04W 4/029 |

FOREIGN PATENT DOCUMENTS

| KR | 10-2013-0067492 A | 6/2013 |
| KR | 10-1303313 B1 | 9/2013 |
| KR | 10-2015-0088983 A | 8/2015 |
| KR | 10-1754724 B1 | 7/2017 |

OTHER PUBLICATIONS

Korean Notice of Allowance (KR 10-2018-0068052), KIPO, dated Jan. 16, 2019.
International Search Report (PCT/KR2019/000928), WIPO, dated Apr. 11, 2019.

* cited by examiner

SOLAR INDUCTION LAMP AND INDUCTION SYSTEM USING SAME

REFERENCE TO RELATED APPLICATIONS

This is a continuation of International Patent Application PCT/KR2019/000928 filed on Jan. 22, 2019, which designates the United States and claims priority of Korean Patent Application No. 10-2018-0068052 filed on Jun. 14, 2018, the entire contents of which are incorporated herein by reference.

FIELD OF THE INVENTION

The present invention relates to a solar guide lamp and a guide system using the same, and specifically, to a solar guide lamp and a guide system using the same, which can improve visibility of vehicle identification and maximize efficiency of vehicle guidance by controlling the color and lighting cycle according to a signal and a specific purpose.

BACKGROUND OF THE INVENTION

Generally, a road marker is one of display means installed on a road to limit a driving range of driving vehicles, and road markers are installed on the center lines of roads, on the lane boundaries, in the safety zones of branching roads, on the front side of crosswalks, speed enforcement sections and the like to promote safe driving, and reflects light of headlights of vehicles especially during night driving to secure visibility of lanes for drivers and induce safe driving.

The road markers for identifying lanes during the day and night are manufactured and installed in various forms to promote safe operation of drivers and vehicles along with development of road facilities.

The road marker (hereinafter, referred to as a prior art) disclosed in Korean Patent Registration No. 10-1303313 (title of invention: Embedded solar road marker for omnidirectional projection) is configured of a base embedded in the ground, a marker body, and a fixing plate.

The marker body is seated inside the base and fixed by the fixing plate to project a light source forward and refract and reflect the light source backward to have visibility of lanes in the front and rear directions.

In addition, the marker body is configured of a solar cell for receiving and converting sunlight into electrical energy, a battery substrate for charging electricity converted by the solar cell, and an LED module for projecting a light source.

The prior art configured as described above has an advantage of preventing damage or deformation caused by the loads and frictional forces of driving vehicles, and preventing infiltration of moisture due to climate changes and inflow of foreign substances on the road.

However, since the prior art is configured to emit light for a predetermined time, not to emit light of an LED in connection with specific information such as a traffic signal or the like, it has a structural limitation incapable of providing detailed information such as traffic signals, guidance signals or the like.

In addition, as the prior art is configured to light an LED of a preset color and to emit light according to a preset flashing cycle, it has a disadvantage in that information other than information for identifying lanes cannot be provided.

At this point, if it is assumed that the lighting cycle is determined under the control of an external controller in the prior art, a communication module for performing wireless communication with a controller should be installed inside the prior art. However, there is a problem in that stability of power supply is lowered since real-time communication through the communication module swiftly consumes power.

SUMMARY OF THE INVENTION

Therefore, the present invention has been made in view of the above problems, and it is an object of the present invention to provide a solar guide lamp and a guide system using the same, which can increase visibility of lane identification and effectively guide vehicles according to signal association and a special purpose by emitting light in various colors and cycles according to the lighting cycle of a controller, as a wireless communication module is installed therein to support wireless communication with the controller.

In addition, another object of the present invention is to provide a solar guide lamp and a guide system using the same, which can enhance energy efficiency by effectively preventing power consumption caused by continuous data communication, as the solar guide lamp is configured to perform wireless communication with the controller according to a preset communication cycle T.

In addition, still another object of the present invention is to provide a solar guide lamp and a guide system using the same, which can perform the functions of lane identification and vehicle guidance while minimizing energy consumption according to charged electric power, as the solar guide lamp is configured to be turned on according to an initial setting without performing wireless communication when a deactivation information generation module detects charged electric power of a capacitor and compares the charged electric power with a threshold value and the charged electric power is lower than the threshold value.

To accomplish the above objects, according to one aspect of the present invention, there is provided a vehicle guide system for guiding vehicles, the system comprising: solar guide lamps including a solar cell, a capacitor for charging electric power stored by the solar cell, LED modules for emitting light of multiple colors, and a control device for controlling on and off of the LED modules, and installed to be buried in a road surface at regular intervals; and a controller for receiving lighting cycle information including a lighting color and a lighting cycle from outside, wherein the control device further includes: a wireless communication module for receiving the lighting cycle information from the controller; a lighting-on-off control module for controlling the LED modules according to the lighting cycle information received from the controller through the wireless communication module; and a control module for activating the wireless communication module to operate only during a preset communication cycle T, and deactivating the wireless communication module to stop the operation when a threshold time is elapsed, and the control device further includes a communication error information generation module for generating communication error information when wireless communication with the controller is not performed for a preset number of times (TH: Threshold), wherein when the communication error information is generated by the communication error information generation module, the control device controls the wireless communication module to transmit the communication error information to the controller, and when the communication error information is received from the control device, the controller re-sets the communication cycle T, and transmits the re-set communication cycle T to the control devices of the solar guide lamps, and the control device performs wireless communication according to the re-set communication cycle T received from the controller, and the control device further includes a deactivation information generation module, and the deactivation information generation module further includes: a charged electric power detection module for detecting charged electric power of the capacitor; a comparison module for comparing the charged electric power detected by the charged electric power detection module with a preset threshold value; and a generation module for generating, when the charged electric power is determined to be lower than the threshold value by the comparison module, deactivation information indicating that wireless communication with the controller is not performed, and when the deactivation information is generated by the deactivation information generation module, the control module of the control device transmits the generated deactivation information to the controller not to drive the wireless communication module.

In addition, in the present invention, the vehicle guide system further comprises an external server for transmitting a preset operation processing value, and it is preferable that the controller sets in advance and stores matching information on matching color and cycle information of each solar guide lamp according to the operation processing value received from the external server, and generates, when the operation processing value is received from the external server, the lighting cycle information according to the received operation processing value using the matching information.

In addition, it is preferable that the external server is a traffic signal light control device, the operation processing value is display cycle information, and the controller generates the lighting cycle information according to the display cycle information received from the traffic signal light control device, and transmits the generated lighting cycle information to the control devices of the solar guide lamps.

According to the present invention having the problems and solutions as described above, as a wireless communication module is installed to support wireless communication with the controller, it is possible to increase visibility of lane identification and effectively guide vehicles according to signal association and a special purpose by emitting light in various colors and cycles according to the lighting cycle of the controller.

In addition, according to the present invention, as the solar guide lamp is configured to perform wireless communication with the controller according to a preset communication cycle T, it is possible to enhance energy efficiency by effectively preventing power consumption caused by continuous data communication.

In addition, according to the present invention, as the solar guide lamp is configured to be turned on according to an initial setting without performing wireless communication when the deactivation information generation module detects charged electric power of a capacitor and compares the charged electric power with a threshold value and the charged electric power is lower than the threshold value, it is possible to perform the functions of lane identification and vehicle guidance while minimizing energy consumption according to the charged electric power.

DETAILED DESCRIPTION OF THE INVENTION

Hereinafter, an embodiment of the present invention will be described with reference to the accompanying drawings.

Figure 1:
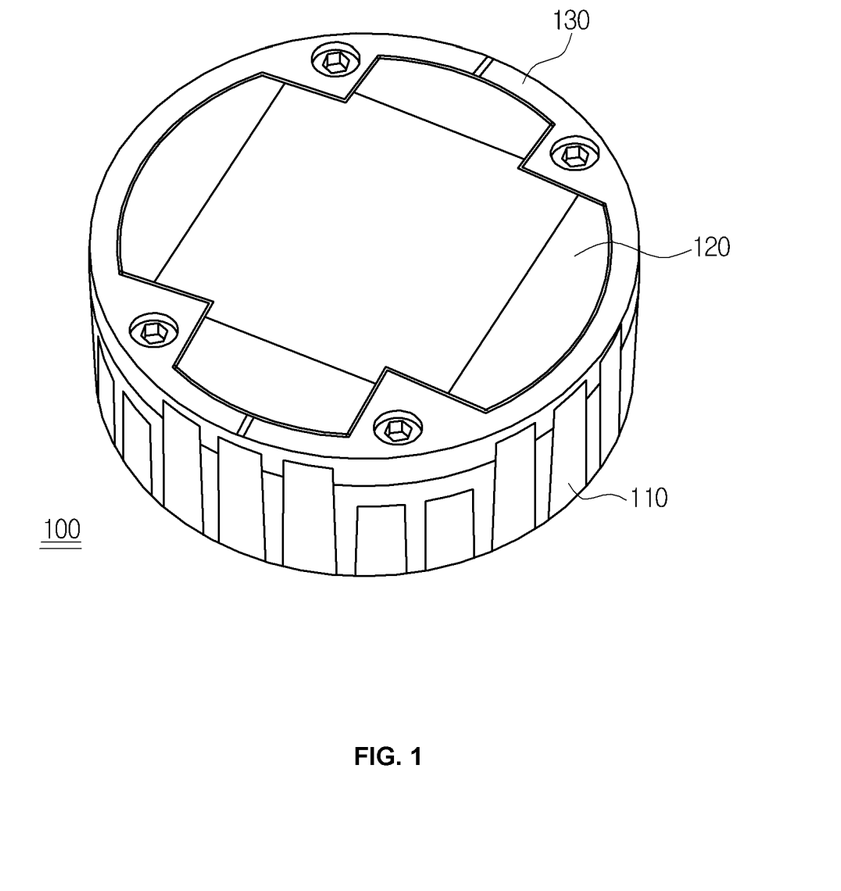
FIG. 1 is a perspective view showing a solar guide lamp according to an embodiment of the present invention.
Figure 2:
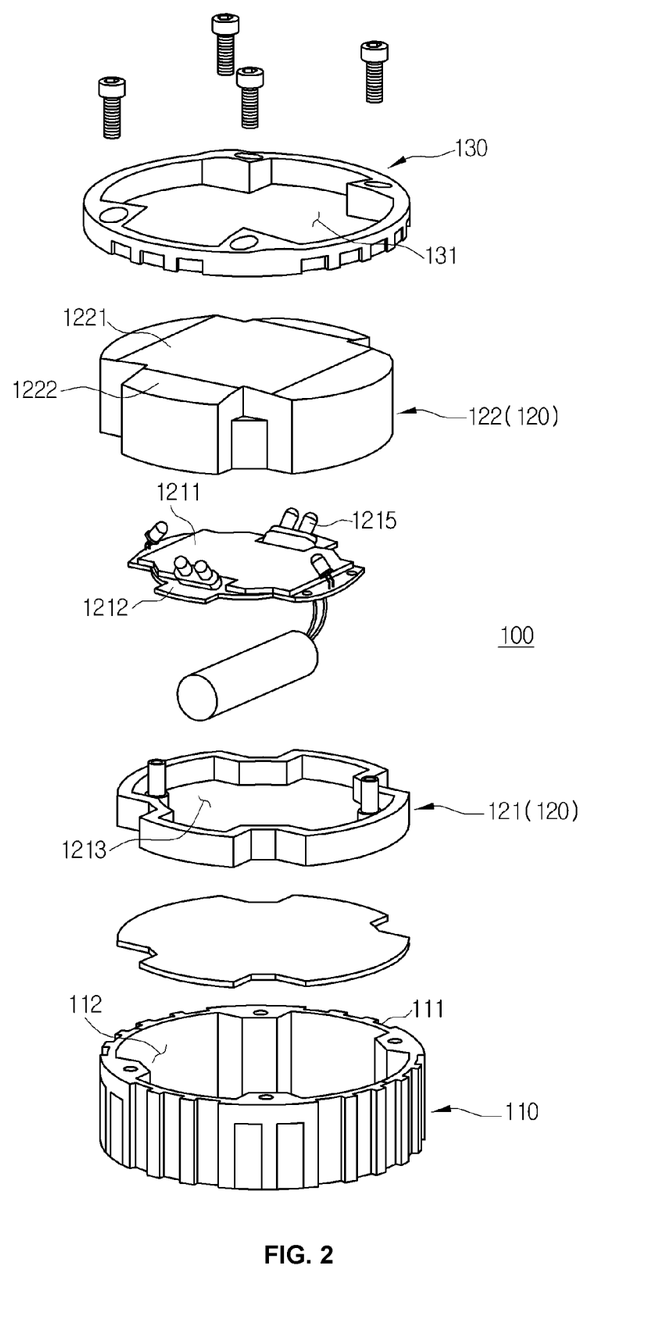
FIG. 2 is an exploded perspective view of FIG. 1.

FIG. 1 is a perspective view showing a solar guide lamp according to an embodiment of the present invention, and FIG. 2 is an exploded perspective view of FIG. 1.

A solar guide lamp 100 according to an embodiment of the present invention is a device installed on the road surface at regular intervals to accomplish the purpose of lane identification and vehicle guidance.

At this point, the solar guide lamp 100 may be installed for any one purpose of a road marker, a delineator, a landscape lamp, a lighting lamp, and a security lamp.

In addition, as shown in FIGS. 1 and 2, the solar guide lamp 100 is configured of a base 110, a marker body 120, a fixing plate 130.

At this point, although the shape and configuration of the solar guide lamp 100 are described in FIGS. 1 and 2 as an example in the present invention for convenience of description, the shape and configuration of the solar guide lamp 100 are not limited thereto, and it is natural that various shapes and configurations may be applied.

The base 110 is formed in a cylindrical shape having an open top and installed to be buried in the road surface.

In addition, the base 110 has an insertion end 111 formed to insert and couple the fixing plate 130 in the top opening. At this point, an elastic ring (not shown) is installed at the insertion end 111 to maintain airtightness with the fixing plate 130.

In addition, a seating unit 112 on which the marker body 120 is seated is provided inside the base 110.

The marker body 120 is seated on the seating unit 112 of the base 110 and fixed by the fixing plate 130.

In addition, as the marker body 120 projects a light source forward and also refracts and reflects the light source backward, it has visibility of lanes or vehicle guidance in the front and rear directions.

In addition, the marker body 120 is configured of a lower case 121 and an upper case 122. At this point, the upper case 122 and the lower case 121 are tightly sealed and coupled to maintain airtightness of the inside to prevent infiltration of moisture or inflow of foreign substances.

In addition, the lower case 121 of the marker body 120 is provided with a solar cell 1211 for receiving sunlight inside thereof and converting the sunlight into electrical energy, and a battery substrate 1212 for charging electricity converted by the solar cell 1211.

In addition, the lower case 121 of the marker body 120 is provided with an insertion unit 1213 through which a battery is inserted into the center.

Meanwhile, the upper case 122 of the marker body 120 has a light incident unit 1221 at the center, through which sunlight enters the solar cell 211.

In addition, the upper case 122 of the marker body 120 has a light transmitting unit 1222 formed on the outer surface of the light incident unit 1221 to project light sources of the LED modules 1215 in the front and rear directions, respectively.

The fixing plate 130 is installed to tightly seal the top opening of the base 110.

In addition, the fixing plate 130 has an exposure unit 131 formed at the center to penetrate both surfaces, and the upper portion of the marker body 120 is exposed to the outside through the exposure unit 131.

Although not shown in the drawing, a control device 180 of FIG. 4 described below, for controlling the operation of each component through communication with the outside, is installed inside the marker body 120 of the solar guide lamp 100 configured as described above.

Figure 3:
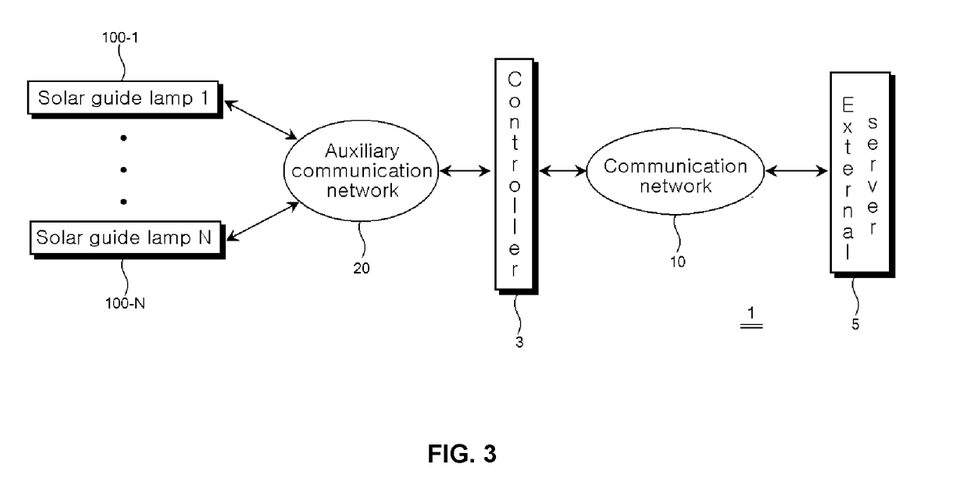
FIG. 3 is a view showing the configuration of a vehicle guide system to which the solar guide lamp of FIG. 1 is applied.

FIG. 3 is a view showing the configuration of a vehicle guide system to which the solar guide lamp of FIG. 1 is applied.

The vehicle guide system 1 of the present invention includes the solar guide lamps 100-1 to 100-N of FIGS. 1 and 2 described above, which are installed to be buried in the road surface at regular intervals, a controller 3 for managing and controlling the solar guide lamps 100-1 to 100-N, an external server 5 for transmitting lighting cycle information to the controller 3, a communication network 10 for providing a data movement path between the controller 3 and the external server 5, and an auxiliary communication network 20 for providing a data movement path between the controller 3 and the solar guide lamps 100-1 to 100-N.

At this point, although it has been described as an example that the communication network 10 and the auxiliary communication network 20 are applied to the vehicle guide system 1 of the present invention, it is natural that the auxiliary communication network 20 for supporting wireless communication between the controller 3 and the solar guide lamps 100-1 to 100-N may be configured to replace the communication network 10.

The communication network 10 supports data communication between the controller 3 and the external server 5 and may be configured as a wide area network (WAN), a wired or wireless network, a mobile communication network, an LTE network, or the like.

The auxiliary communication network 20 supports wireless communication between the controller 3 and the solar guide lamps 100-1 to 100-N, and specifically, it may be configured as a short-range communication network such as Bluetooth, Wi-Fi, Near Field Communication (NFC) or the like, an IoT-dedicated network, a wireless network or the like.

The external server 5 is a server of a system having a specific purpose, and specifically, it may be configured as a server of a traffic signal light control device, a parking system, or a control center.

In addition, the external server 5 detects an operation processing value for accomplishing the purpose of an applied system. At this point, when the external server is a traffic signal light control device, the operation processing value may be display cycle information, and when the external server is a parking system, the operation processing value may be a vehicle detection data of each parking surface.

The controller 3 manages and controls the solar guide lamps 100-1 to 100-N allocated to the controller 3 by performing wireless communication with the solar guide lamps 100-1 to 100-N through the auxiliary communication network 20.

In addition, location information and communication identification information of each of the solar guide lamps 100-1 to 100-N are preset and stored in the controller 3, and driving direction information of a corresponding road is preset and stored in the controller 3.

In addition, the controller 3 stores matching information on matching color and cycle information of each solar guide lamp 100 corresponding to the operation processing value received from the external server 5.

For example, the matching information may match the lighting color of the solar guide lamp 100 installed on the road in red color when display of the vehicle traffic signal light is red indicating stop of vehicles, and the lighting color of the solar guide lamp 100 installed on the crosswalk may be matched in green color when display of the pedestrian traffic signal light is green indicating walk of pedestrians.

That is, as drivers or pedestrians may identify lanes through the lighting color and cycle of the solar guide lamps 100 and more effectively recognize traffic signals, car accidents may be efficiently prevented.

In addition, when the operation processing value is received from the external server 5, the controller 3 generates lighting cycle information of each solar guide lamp 100 according to the operation processing value using the matching information, and transmits corresponding lighting cycle information to each solar guide lamp 100. At this point, the lighting cycle information includes a lighting color, a lighting-on time, a lighting-off time and the like of each solar guide lamp 100.

At this point, if the controller 3 continuously transmits the lighting cycle information to the solar guide lamps 100-1 to 100-N, power consumption increases due to wireless communication since available electric power of the solar guide lamps 100-1 to 100-N is limited, and accordingly, there is a problem in that the light source may not be emitted due to insufficient power.

Accordingly, since it is configured, in the present invention to solve this problem, such that the controller 3 does not continuously transmit the lighting cycle information to the solar guide lamps 100-1 to 100-N, but transmits the lighting cycle information at a preset communication cycle T, power consumption of the solar guide lamps 100 having limited available power is significantly reduced.

As described above, as the vehicle guide system 1 of the present invention is configured to turn on and off the solar guide lamps 100-1 to 100-N in various colors and cycles by performing wireless communication with the controller 3, it is possible to increase visibility of lane identification and efficiently guide vehicles in association with traffic signals or according to a specific purpose, and particularly, the wireless communication is performed only during the communication cycle T to minimize power consumption caused by data communication of the solar guide lamps 100-1 to 100-N operated by the power stored from the sunlight.

Figure 4:
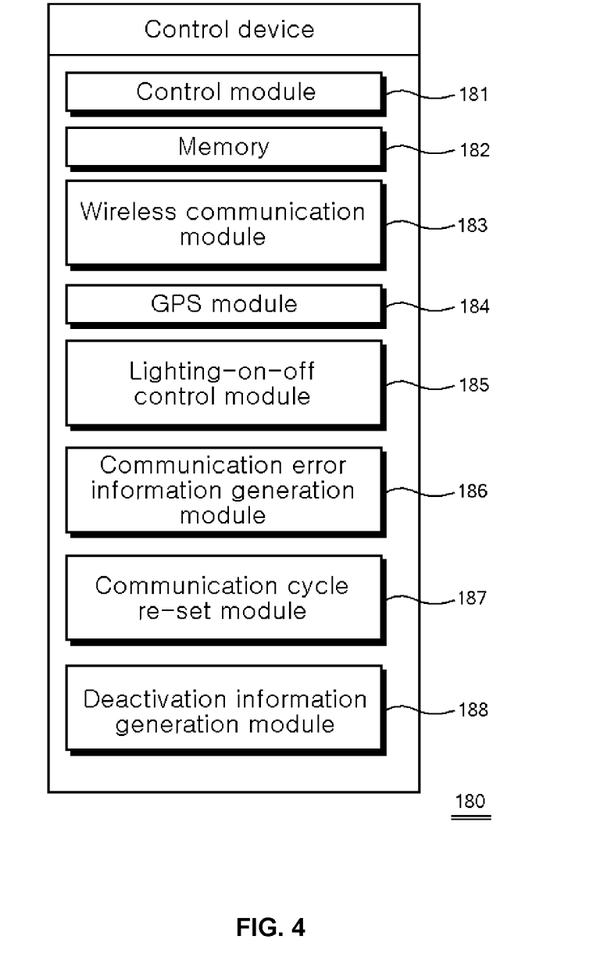
FIG. 4 is a block diagram showing the control device of the solar guide lamp of FIG. 3.

FIG. 4 is a block diagram showing the control device of the solar guide lamp of FIG. 3.

The control device 180 of FIG. 4 performs data communication with the controller 3 at every preset communication cycle T to control on and off of the LED module 1215 to emit a light source according to the lighting cycle information received from the controller 3. At this point, the control device 180 may be manufactured in the form of a board or a chip.

In addition, as shown in FIG. 4, the control device 180 is configured of a control module 181, a memory 182, a wireless communication module 183, a GPS module 184, a lighting-on-off control module 185, a communication error information generation module 186, a communication cycle T re-set module 187, and a deactivation information generation module 188.

The control module 181 is an operating system (OS) of the control device 180, and manages and controls the control targets 182, 183, 184, 185, 186, 187 and 188.

In addition, the control module 181 activates the wireless communication module 183 and the GPS module 184 to operate when a preset communication cycle T or a communication cycle T re-set by the communication cycle re-set module 187 arrives, and deactivates the modules to stop the operation when a threshold time is elapsed.

In addition, when the lighting cycle information is received from the controller 3 during the communication cycle T, the control module 181 inputs the received lighting cycle information into the lighting-on-off control module 185.

In addition, when communication error information is generated by the communication error information generation module 186, the control module 181 controls the wireless communication module 183 to transmit the generated communication error information to the controller 3.

In addition, when the re-set communication cycle T is received from the controller 3, the control module 181 inputs the inputted re-set communication cycle T into the communication cycle re-set module 187.

In addition, when deactivation information is generated by the deactivation information generation module 188, the control module 181 controls the wireless communication module 183 to transmit the generated deactivation information to the controller 3. At this point, the deactivation information is defined as information for deactivating wireless communication with the controller 3 when the electric power charged by the capacitor is lower than a threshold value.

The communication cycle T and the lighting cycle information are stored in the memory 182.

The wireless communication module 183 does not operate in normal times, and operates at the preset communication cycle T or the communication cycle T re-set by the communication cycle re-set module 187 under the control of the control module 181 to transmit and receive data with the controller 3 through the auxiliary communication network 20.

The GPS module 184 synchronizes the current time in association with a GPS satellite at every predetermined cycle so that lighting of the solar guide lamps 100-1 to 100-N is accurately performed according to the lighting cycle information.

The lighting-on-off control module 185 controls on and off of each of the LED modules 1215 according to the lighting cycle information received from the controller 3 through the wireless communication module 183 so that lighting may be accomplished according to the lighting cycle information.

The communication error information generation module 186 generates communication error information when wireless communication with the controller 3 is not performed for a preset number of times (TH: Threshold).

At this point, the communication error information generated by the communication error information generation module 186 is transmitted to the controller 3 under the control of the control module 181, and when the communication error information is received from the control device 180 of the solar guide lamp 100, the controller 3 re-sets the communication cycle T and transmits the re-set communication cycle T to all the solar guide lamps 100-1 to 100-N.

That is, since the control device 180 of the present invention is configured to perform wireless communication with the controller 3 only during a preset communication cycle T, the communication cycle T is re-set when the wireless communication cannot be performed due to such reasons as a synchronization error, a cycle setting error or the like, and wireless communication is performed later according to the re-set communication cycle T, so that a prompt and immediate response to a communication error can be achieved.

The communication cycle re-set module 187 re-sets the re-set communication cycle T received from the controller 3 as a communication cycle applied later.

In other words, as the control device 180 performs wireless communication with the controller 3 according to the communication cycle re-set by the communication cycle re-set module 187, the control device 180 may solve a communication error by itself even when the communication error occurs.

Figure 5:
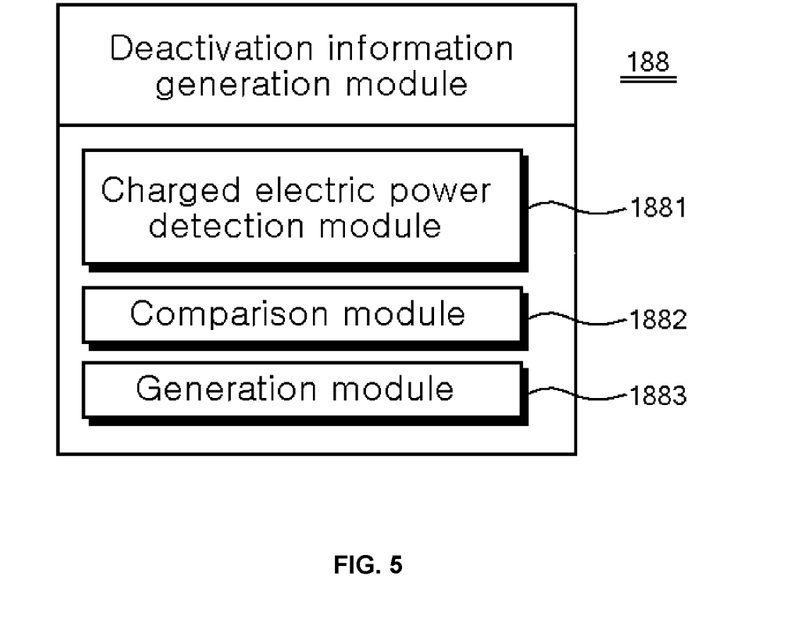
FIG. 5 is a block diagram showing the deactivation information generation module of FIG. 4.

FIG. 5 is a block diagram showing the deactivation information generation module of FIG. 4.

As shown in FIG. 5, the deactivation information generation module 188 is configured of a charged electric power detection module 1881 for detecting charged electric power of a capacitor, a comparison module 1882 for comparing the charged electric power detected by the charged electric power detection module 1881 with a threshold value, and a generation module 1883 that is driven to generate deactivation information when the charged electric power is determined to be lower than the threshold value by the comparison module 1882.

At this point, the deactivation information is defined as information for deactivating wireless communication with the controller 3 when the electric power charged by the capacitor is lower than a threshold value, and when the deactivation information is received from the control device 180 of the solar guide lamp 100, the controller 3 does not perform wireless communication with the corresponding solar guide lamp 100 thereafter.

Figure 6:
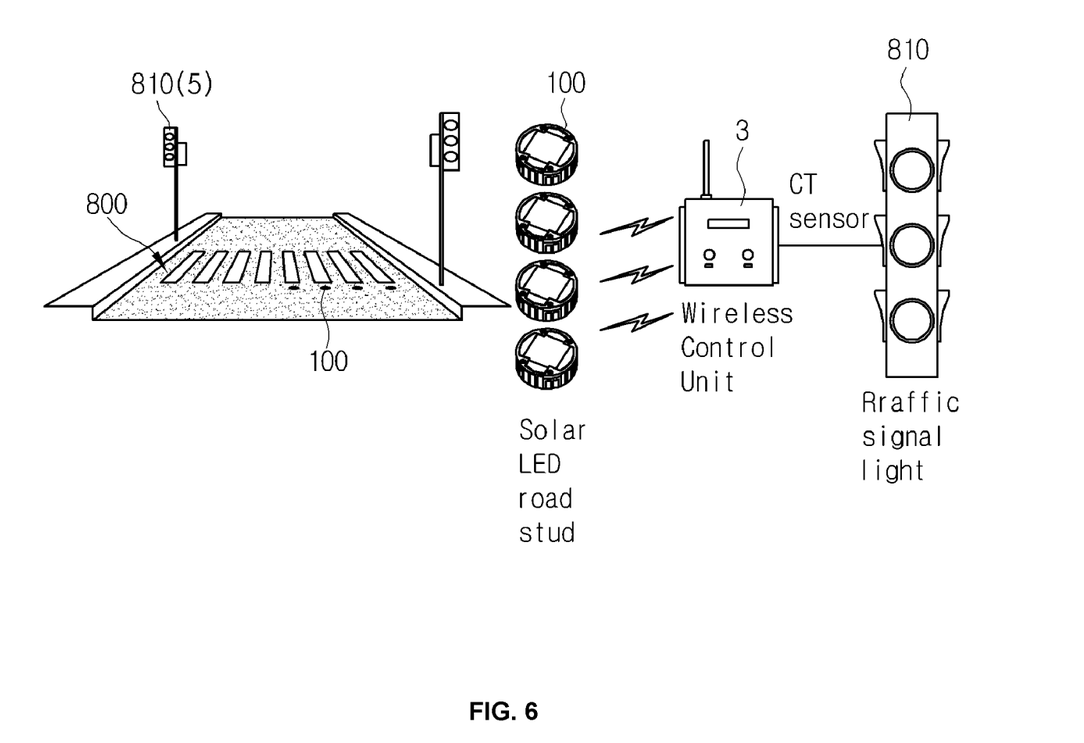
FIG. 6 is a view showing an example of the vehicle guide system of the present invention associated with pedestrian traffic signal lights.

FIG. 6 is a view showing an example of the vehicle guide system of the present invention associated with pedestrian traffic signal lights.

As shown in FIG. 6, when the vehicle guide system 1 of the present invention is associated with a pedestrian traffic signal light 810, the solar guide lamps 100 may be installed on both sides of a crosswalk 800.

At this point, when a display cycle is received from the control device of the pedestrian traffic signal light 810, the controller 3 generates lighting cycle information corresponding to the received display cycle using preset matching information.

In addition, the controller 3 transmits the lighting cycle information generated at every preset communication cycle T to the solar guide lamps 100, and the control device 180 of the solar guide lamp 100 controls the LED to emit light of a color corresponding to the lighting cycle received from the controller 3, so that vehicle drivers may immediately recognize traffic signals through the solar guide lamp 100, as well as the vehicle traffic signal light.

At this point, when the charged electric power of the solar guide lamp 100 is lower than a threshold value as illumination is insufficient due to rain or the like during the daytime, the solar guide lamps 100 operates according to an initial setting without performing wireless communication with the controller 3.

Figure 7:
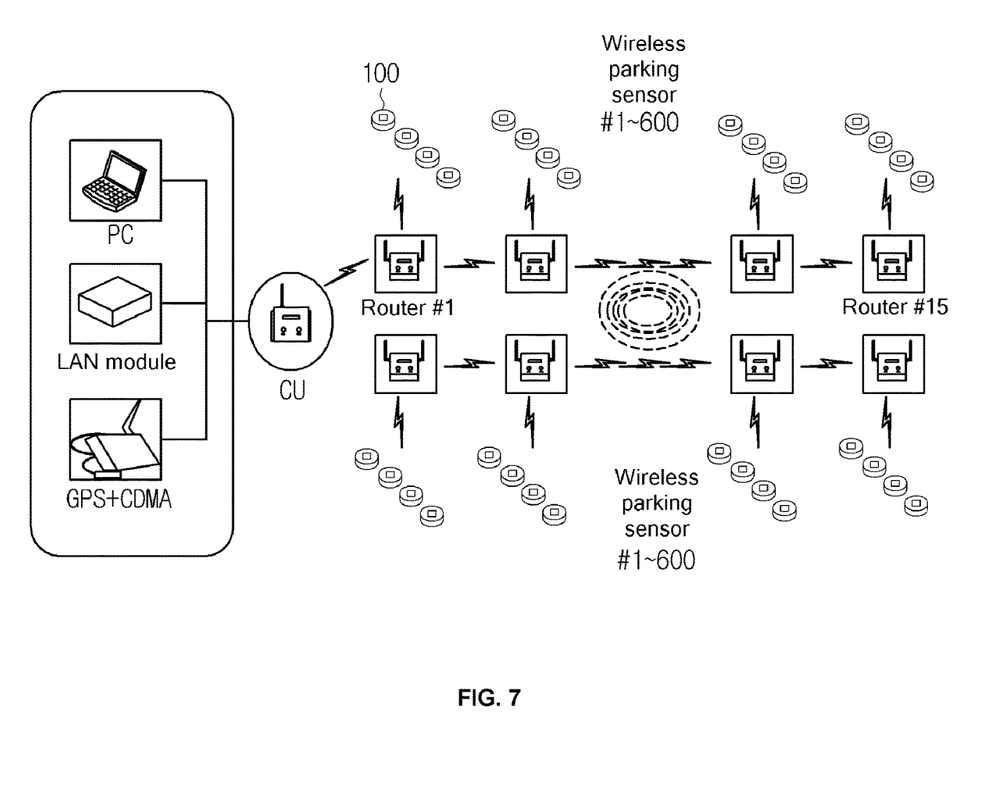
FIG. 7 is a view showing an example of the vehicle guide system of the present invention installed in a parking lot.

FIG. 7 is a view showing an example of the vehicle guide system of the present invention installed in a parking lot.

As shown in FIG. 7, when the vehicle guide system 1 of the present invention is installed in a parking lot, the solar guide lamps 100 may be installed for the purpose of guiding vehicles to each parking surface.

At this point, the controller 3 may guide drivers to a selected parking space by performing wireless communication with parking sensors which sense presence of a vehicle on each parking surface.

As described above, as the wireless communication module 183 is installed to support wireless communication with the controller 3, the solar guide lamp 100 according to an embodiment of the present invention may increase visibility of lane identification and effectively guide vehicles according to signal association and a special purpose by emitting light in various colors and cycles according to the lighting cycle of a controller.

In addition, as the solar guide lamp 100 of the present invention is configured to perform wireless communication with the controller 3 according to a preset communication cycle T, it is possible to enhance energy efficiency by effectively preventing power consumption caused by continuous data communication.

In addition, as the solar guide lamp 100 is configured to be turned on according to an initial setting without performing wireless communication when the deactivation information generation module 188 detects charged electric power of a capacitor and compares the charged electric power with a threshold value and the charged electric power is lower than the threshold value, it is possible to perform the functions of lane identification and vehicle guidance while minimizing energy consumption according to the charged electric power.

What is claimed is:

1. A vehicle guide system for guiding vehicles, the system comprising:
   solar guide lamps including a solar cell, a capacitor for charging electric power stored by the solar cell, LED modules for emitting light of multiple colors, and a control device for controlling on and off of the LED modules, and installed to be buried in a road surface at regular intervals; and
   a controller for receiving lighting cycle information including a lighting color and a lighting cycle from outside, wherein
   the control device further includes:
   a wireless communication module for receiving the lighting cycle information from the controller;
   a lighting-on-off control module for controlling the LED modules according to the lighting cycle information received from the controller through the wireless communication module; and
   a control module for activating the wireless communication module to operate only during a preset communication cycle T, and deactivating the wireless communication module to stop the operation when a threshold time is elapsed, and
   the control device further includes a communication error information generation module for generating communication error information when wireless communication with the controller is not performed for a preset number of times (TH: Threshold), wherein
   when the communication error information is generated by the communication error information generation module, the control device controls the wireless communication module to transmit the communication error information to the controller, and
   when the communication error information is received from the control device, the controller re-sets the communication cycle T, and transmits the re-set communication cycle T to the control devices of the solar guide lamps, and
   the control device performs wireless communication according to the re-set communication cycle T received from the controller, and
   the control device further includes a deactivation information generation module, and
   the deactivation information generation module further includes:
   a charged electric power detection module for detecting charged electric power of the capacitor;
   a comparison module for comparing the charged electric power detected by the charged electric power detection module with a preset threshold value; and
   a generation module for generating, when the charged electric power is determined to be lower than the threshold value by the comparison module, deactivation information indicating that wireless communication with the controller is not performed, and
   when the deactivation information is generated by the deactivation information generation module, the control module of the control device transmits the generated deactivation information to the controller not to drive the wireless communication module,
   wherein the system further comprises an external server for transmitting a preset operation processing value, wherein the controller sets in advance and stores matching information on matching color and cycle information of each solar guide lamp according to the operation processing value received from the external server, and generates, when the operation processing value is received from the external server, the lighting cycle information according to the received operation processing value using the matching information.

2. The system according to claim 1, wherein the external server is a traffic signal light control device, the operation processing value is display cycle information, and the controller generates the lighting cycle information according to the display cycle information received from the traffic signal light control device, and transmits the generated lighting cycle information to the control devices of the solar guide lamps.

* * * * *